(12) United States Patent
Goehlich

(10) Patent No.: US 8,844,870 B2
(45) Date of Patent: Sep. 30, 2014

(54) FUSELAGE SEGMENT, AND METHOD FOR THE PRODUCTION OF A FUSELAGE SEGMENT

(75) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 99 days.

(21) Appl. No.: 13/262,246

(22) PCT Filed: Mar. 30, 2010

(86) PCT No.: PCT/EP2010/054247
§ 371 (c)(1),
(2), (4) Date: Dec. 16, 2011

(87) PCT Pub. No.: WO2010/112527
PCT Pub. Date: Oct. 7, 2010

(65) Prior Publication Data
US 2012/0187245 A1    Jul. 26, 2012

Related U.S. Application Data

(60) Provisional application No. 61/165,527, filed on Apr. 1, 2009.

(30) Foreign Application Priority Data

Apr. 1, 2009    (DE) ................. 10 2009 015 856

(51) Int. Cl.
| | | |
|---|---|---|
| B64C 1/00 | (2006.01) | |
| B64C 1/12 | (2006.01) | |
| B32B 5/32 | (2006.01) | |
| B64D 11/00 | (2006.01) | |
| B32B 27/04 | (2006.01) | |
| B64C 1/40 | (2006.01) | |
| B64D 13/00 | (2006.01) | |
| B32B 27/02 | (2006.01) | |

(52) U.S. Cl.
CPC .. *B64C 1/12* (2013.01); *Y02T 50/43* (2013.01); *B32B 5/32* (2013.01); *B64C 2001/0072* (2013.01); *Y02T 50/433* (2013.01); *B64D 11/00* (2013.01); *Y02T 50/44* (2013.01); *B32B 27/04* (2013.01); *B64C 1/40* (2013.01); *B64D 13/00* (2013.01); *B32B 27/02* (2013.01); *Y02T 50/46* (2013.01)
USPC ........................................ 244/119; 244/123.5

(58) Field of Classification Search
USPC ............... 244/119, 120, 123.5, 123.13, 171.8
See application file for complete search history.

(56) References Cited

U.S. PATENT DOCUMENTS

| | | | | |
|---|---|---|---|---|
| 3,135,486 | A | * | 6/1964 | Wing .......................... 244/123.8 |
| 3,490,718 | A | * | 1/1970 | Vary ........................... 244/171.8 |

(Continued)

FOREIGN PATENT DOCUMENTS

| | | |
|---|---|---|
| DE | 10 2007 003278 A1 | 7/2008 |
| EP | 0 730 951 A1 | 9/1996 |

(Continued)

OTHER PUBLICATIONS

International Search Report for Appln. No. PCT/EP2010/054247 mailed Dec. 2, 2010.

*Primary Examiner* — Tien Dinh
*Assistant Examiner* — Steven Hawk
(74) *Attorney, Agent, or Firm* — Carter, DeLuca, Farrell & Schmidt, LLP

(57) ABSTRACT

A fuselage segment of an aircraft fuselage is provided with an outer skin and an inner skin that are spaced apart from one another by a core, wherein conduits for system installations are integrated into the core, as well as a method for manufacturing such a fuselage segment.

9 Claims, 1 Drawing Sheet

(56) References Cited

U.S. PATENT DOCUMENTS

| | | | |
|---|---|---|---|
| 3,559,920 A * | 2/1971 | Moore | 244/119 |
| 3,881,566 A * | 5/1975 | Moore | 244/119 |
| 4,819,720 A * | 4/1989 | Howard | 165/104.34 |
| 5,242,523 A * | 9/1993 | Willden et al. | 244/119 |
| 5,300,124 A * | 4/1994 | Breault et al. | 29/623.3 |
| 5,806,796 A * | 9/1998 | Healey | 244/117 R |
| 5,961,902 A * | 10/1999 | Ishitoya et al. | 264/45.9 |
| 6,065,366 A * | 5/2000 | Koyama et al. | 74/552 |
| 7,025,305 B2 * | 4/2006 | Folkesson et al. | 244/117 R |
| 7,055,781 B2 * | 6/2006 | Behrens et al. | 244/159.3 |
| 7,716,835 B2 * | 5/2010 | Johnson et al. | 244/119 |
| 8,042,767 B2 * | 10/2011 | Velicki et al. | 244/117 R |
| 2004/0023039 A1 * | 2/2004 | Schwamb et al. | 428/441 |
| 2004/0155148 A1 * | 8/2004 | Folkesson et al. | 244/119 |
| 2005/0044712 A1 * | 3/2005 | Gideon et al. | 29/897.32 |
| 2006/0182914 A1 * | 8/2006 | Yasumatsu et al. | 428/36.8 |
| 2008/0185478 A1 | 8/2008 | Dannenberg | |
| 2010/0252681 A1 * | 10/2010 | Grillos | 244/119 |

FOREIGN PATENT DOCUMENTS

| | | |
|---|---|---|
| EP | 1 510 454 A1 | 3/2005 |
| WO | 02/098734 A1 | 12/2002 |

\* cited by examiner

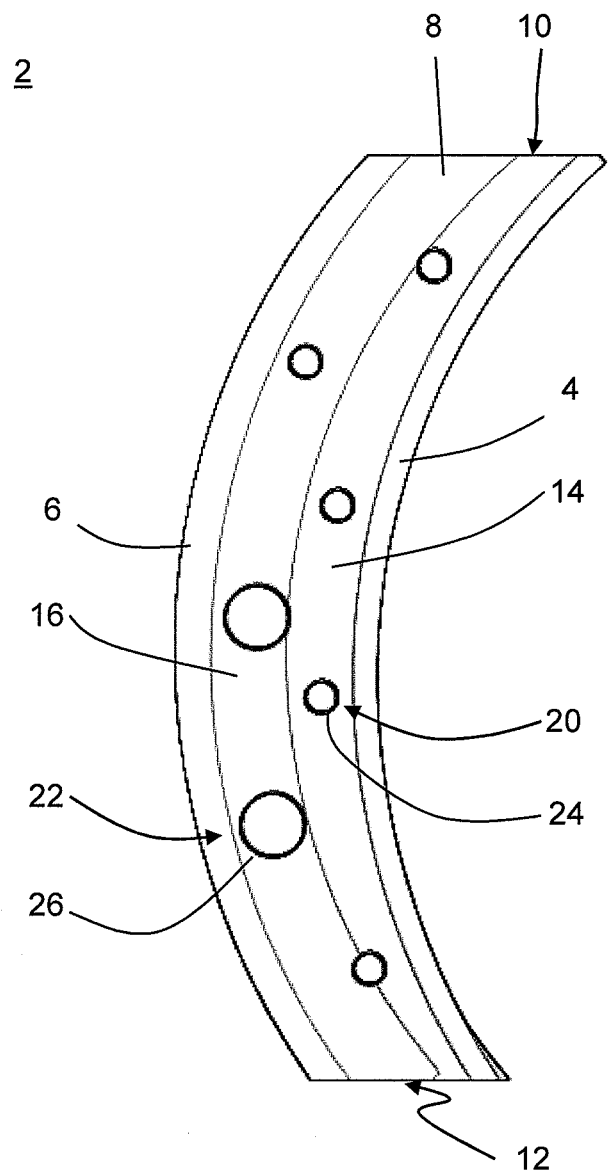

FUSELAGE SEGMENT, AND METHOD FOR THE PRODUCTION OF A FUSELAGE SEGMENT

The invention pertains to a fuselage segment of an aircraft fuselage according to the preamble of claim 1 and to a method for manufacturing such a fuselage segment.

A known fuselage segment is disclosed in DE 10 2007 003 275 A1 of the applicant. This fuselage segment is realized in the form of a shell element with two CFRP-skins, between which a core with a honeycomb structure or a foam structure is arranged. The shell element forms an aircraft fuselage together with a plurality of similar shell elements, wherein this aircraft fuselage is reinforced with a plurality of stringers and frames for stabilization purposes. All conduits for system installations such as, for example, electrical cables and air-conditioning ducts are respectively mounted on corresponding brackets of the stringers and frames.

In this solution, it is disadvantageous that equipment systems and cabin elements are installed separately in the primary structure. The mounting of the conduits requires numerous brackets that increase the cost of the fuselage assembly. Furthermore, the brackets disadvantageously affect the weight of the aircraft.

It is the objective of the present invention to develop a fuselage segment of an aircraft fuselage that eliminates the aforementioned disadvantages and allows a simplified assembly, as well as a method for manufacturing such a fuselage segment.

This objective is attained with a fuselage segment with the characteristics of claim 1 and a method according to claim 10.

An inventive fuselage segment features a core that is covered by an inner skin on the cabin side and an outer skin. According to the invention, ducts for system installations are integrated into the core.

The inventive solution provides the advantage that brackets are no longer required for mounting conduits such as, e.g., air-conditioning ducts. The assembly of the aircraft fuselage therefore becomes less complex. In addition, the elimination of the brackets lowers the weight of the aircraft in comparison with known aircraft with bracket solutions. For example, electromagnetic interactions between current-carrying cables can be prevented by accordingly positioning the conduits relative to one another. The elimination of the brackets also makes it possible to lower the assembly and manufacturing costs. The inventive fuselage segment may furthermore be realized in such a way that stringers and frames or other longitudinal and circumferential reinforcements of the aircraft fuselage can be eliminated, wherein this also positively affects the assembly and the weight of the aircraft. With respect to its structure, the fuselage segment can be optimized in accordance with the occurring loads.

In one exemplary embodiment, the fuselage segment is composed of several parts. In this case, the core is manufactured separately of the outer skin and the inner skin. The core has, for example, a honeycomb structure.

In another exemplary embodiment, the fuselage segment does not have a sandwich structure, but rather a one-piece foam structure, in which the inner skin, the outer skin and the core are realized in one piece. This means that the inner skin and the outer skin are not bonded to the core or otherwise connected to the core, but created during a manufacturing step of the core. In other words, the inner skin and the outer skin consist of the same foam material that is sectionally subjected to a different type of treatment. In this exemplary embodiment, it is advantageous to reinforce the foam material with carbon fibers such that the carbon fiber reinforcement effectively extends through the core from the outer skin to the inner skin.

The material of the core and the material of the outer skin and the inner skin may have a different hardness. It is particularly advantageous if the hardness of the core material increases from a region on the cabin side in the direction of the outer skin. In this way, the stability of the fuselage segment can be increased and the insulation can be improved due to the reduced hardness of the material in the region on the cabin side.

The core may consist of a multilayer foam material such that a purposeful insulation can be achieved. Condensation within the fuselage segment can be significantly reduced with a sensible configuration of the foam material because erratic temperature gradients hardly occur.

In one variation, the conduits consist of tubular elements.

In order to additionally lower the weight of the aircraft, the conduits are in another variation integrated into the core in such a way that their wall is formed by the core material.

The inner skin may form a side wall of the cabin. The realization of the side wall in the form of a component of the primary structure reduces the number of cabin components such that the assembly becomes even less complex.

According to an exemplary embodiment of the inventive method, the conduits are produced in the core during the manufacture thereof.

According to another exemplary embodiment, the conduits are produced in the core after the manufacture thereof. In this case, the conduits are respectively substituted or replaced with suitable filler materials during the manufacture of the core. The filler materials are removed from the core after the manufacture thereof such that the core material itself forms the walls of the conduits. The fillers may consist, for example, of wax-based tubular bodies that liquefy and flow out of the core during a corresponding treatment after the manufacture thereof such that a conduit in the form of a correspondingly shaped hollow space is created in the core.

According to another inventive method, the inner skin, the outer skin and the core already have their final structure with the required material properties and material structures after the removal of the fuselage segment from the moulding tool.

However, it is also possible to provide the foam material and, in particular, the inner skin and the outer skin with the required material properties such as, for example, the corresponding degree of hardness in a step that is carried out after the removal of the fuselage segment from the moulding tool. It would be conceivable, for example, to carry out a treatment under UV-light.

A plastic-based material, as well as a metal-based material, may be considered as suitable foam material. Likewise, the materials of the inner skin and the outer skin are not limited to CFRP-materials, but may also consist of other fiber-reinforced composite materials such as glass fiber-reinforced materials (GFR-materials), plastic-metal alloys or pure metal alloys. It would furthermore be conceivable that the inner skin and the outer skin consist of different materials.

The conduits are not limited to the aforementioned examples only, but rather may also be used for all systems to be installed in an aircraft. Other examples are electrical cables for the power supply of the airborne supply system, signal lines for the flight control and water conduits.

Openings for windows and doors are either created during the manufacture of the fuselage cell or subsequently produced in the fuselage cell.

The axial length of the fuselage segment and its circumference may vary. It would be conceivable to realize the fuselage segment in the form of a shell element that, in principle, extends over the entire length of the aircraft. It would likewise be conceivable to realize the fuselage segment in the form of a barrel element that can be joined into an aircraft fuselage by means of transverse butt joints (cross butt joints).

Other advantages exemplary embodiments of the invention form the objects of the dependent claims.

Preferred exemplary embodiments of the invention are described in greater detail below with reference to a schematic drawing.

The only FIG. 1 shows a cross section through an inventive fuselage segment 2 of an aircraft fuselage. The fuselage segment 2 is realized in the form of a curved shell element of sandwich construction with an inner skin 4 and an outer skin 6, between which a core 8 is arranged. In the region of its narrow sides 10, 12, the fuselage segment 2 and other not-shown inventive fuselage segments are assembled into a barrel-shaped fuselage.

The inner skin 4 forms a sidewall of an aircraft cabin. The outer skin 6 serves as the common outer surface of an aircraft fuselage and protects the core 8 from environmental influences. The inner skin 4 and the outer skin 6 consist of a carbon fiber-reinforced material (CFR-material) and are connected to the core 8. The material of the inner skin 4 and the outer skin has a higher hardness than that of the core 8.

The core 8 consists of a foam material and features a radially inner layer 14 and a radially outer layer 16. The hardness of the radially inner layer 14 is lower than that of the radially outer layer 16 in order to improve the insulation.

Conduits 20, 22 for system installations such as, for example, current-carrying cable harnesses, cable harnesses that carry data signals or air-conditioning ducts are integrated into the core 8. Only two conduits 20, 22 are identified by reference symbols in FIG. 1 and representative for all other conduits. The conduits 20, 22 are realized in the form of tubular elements 24, 26 produced in the core 8. With respect to their position in the core 8 and their inside diameter, they correspond to their respective function. Conduits 20 for accommodating cable harnesses that carry data signals generally have a smaller inside diameter than conduits 22 that form air-conditioning ducts.

The degrees of hardness of the inner skin 4, the outer skin 6 and the core 8 are chosen such that no stringers and frames or other types of longitudinal and circumferential reinforcements are required for creating the aircraft fuselage.

In an inventive method, the tubular elements 24, 26 for the conduits 20, 22 are positioned in a moulding tool for moulding the core 8. Subsequently, the mould is filled with a suitable plastic-based raw material in order to create the core 8. The moulding tool is then activated in such a way that the foam-like core 8 is formed. The inner skin 4 and the outer skin 6 are manufactured in conventional fashion. After the manufacture of the core 8, the inner skin 4 and the outer skin 6, they are correspondingly connected to one another.

The invention discloses a fuselage segment 2 of an aircraft fuselage with an outer skin 6 and an inner skin 4 that are spaced apart from one another by a core 8, wherein conduits 20, 22 for system installations are integrated into the core 8, as well as a method for manufacturing such a fuselage segment 2.

LIST OF REFERENCE SYMBOLS

2 Fuselage segment
4 Inner skin
6 Outer skin
8 Core
10 Narrow side
12 Narrow side
14 Radially inner layer
16 Radially outer layer
20 Conduit
22 Conduit
24 Tubular element
26 Tubular element

The invention claimed is:

1. A fuselage segment of an aircraft fuselage, comprising:
an inner skin on a cabin side of the aircraft fuselage; and
an outer skin of the aircraft fuselage that covers a core, where conduits for system installations are integrated into the core,
wherein at least the core consists of a foam material wherein the material hardness of the foam material increases from a center region of the core to the outer skin and from the center region of the core to the inner skin.

2. The fuselage segment according to claim 1, wherein the inner skin and the outer skin are realized separately of the core.

3. The fuselage segment according to claim 1, wherein the fuselage segment is realized in one piece.

4. The fuselage segment according to claim 1, wherein the core is constructed from a multilayer foam material.

5. The fuselage segment according to claim 1, wherein the conduits are formed as tubular elements.

6. The fuselage segment according to claim 1, wherein a number of the conduits are integrated into the core such that an outer surface of each of the number of conduits engages the core.

7. The fuselage segment according to claim 1, wherein the inner skin forms a sidewall of a cabin.

8. A method for manufacturing a fuselage segment according to claim 1, wherein the conduits are produced in the core during the manufacture of the core.

9. A fuselage segment of an aircraft fuselage, comprising:
an inner skin of the aircraft fuselage;
an outer skin of the aircraft fuselage; and
a core interposed between the inner skin and the outer skin, wherein the core comprises a foam material the material hardness of which increases in a direction extending from a portion proximate the inner skin towards a portion proximate the outer skin, wherein conduits for system installations are integrated within the core.

* * * * *